US010556836B2

(12) United States Patent
Iannotta et al.

(10) Patent No.: US 10,556,836 B2
(45) Date of Patent: *Feb. 11, 2020

(54) SOLVENT SYSTEMS OF N-ALKYL THIOPHOSPHORIC TRIAMIDES AND METHODS OF USE IN AGRICULTURAL APPLICATIONS

(71) Applicants: RHODIA OPERATIONS, Aubervillers (FR); ROSEN'S INC., Liberty, MO (US)

(72) Inventors: Leahann Iannotta, Wayne, PA (US); Rajesh Pazhianur, Belle Mead, NJ (US); Krish Murthy Shanmuga, Plainsboro, NJ (US); John A. Latting, Bluffton, SC (US); T. Kent Woodall, Kearney, MO (US)

(73) Assignees: RHODIA OPERATIONS, Aubervilliers (FR); ROSEN'S INC., Liberty, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,352

(22) Filed: Dec. 3, 2018

(65) Prior Publication Data
US 2019/0100468 A1  Apr. 4, 2019

Related U.S. Application Data

(63) Continuation of application No. 13/711,768, filed on Dec. 12, 2012, now Pat. No. 10,173,935.

(60) Provisional application No. 61/630,456, filed on Dec. 12, 2011.

(51) Int. Cl.
*C05B 15/00*    (2006.01)
*C05G 3/08*     (2006.01)

(52) U.S. Cl.
CPC ............ *C05B 15/00* (2013.01); *C05G 3/08* (2013.01)

(58) Field of Classification Search
CPC .................................................. C05B 15/00
See application file for complete search history.

(56) References Cited

U.S. PATENT DOCUMENTS

| 3,152,039 A | 10/1964 | Mattson |
| 3,353,949 A | 11/1967 | Nau |
| 3,425,819 A | 2/1969 | Barry et al. |
| 3,986,859 A | 10/1976 | Molinet |
| 4,530,714 A | 7/1985 | Kolc et al. |
| 4,686,790 A | 8/1987 | Lahalih et al. |
| 4,745,200 A | 5/1988 | Moeller |
| 4,943,307 A | 7/1990 | Detre et al. |
| 5,024,689 A | 6/1991 | Sutton et al. |
| 5,071,463 A | 12/1991 | Narayanan et al. |
| 5,160,528 A | 11/1992 | Chaudhuri et al. |
| 5,352,265 A | 10/1994 | Weston et al. |
| 5,364,438 A * | 11/1994 | Weston ............ C05C 1/00 71/29 |
| 5,435,821 A | 7/1995 | Duvdevani et al. |
| 5,698,003 A * | 12/1997 | Omilinsky ........ C05C 9/00 71/28 |
| 5,770,771 A * | 6/1998 | Sulzer ............ C01C 1/164 564/14 |
| 5,883,297 A * | 3/1999 | Sulzer ............ C01C 1/164 564/14 |
| 6,262,183 B1 | 7/2001 | Domb et al. |
| 6,315,919 B1 * | 11/2001 | Sapienza ........ C09K 3/18 106/13 |
| 6,451,746 B1 * | 9/2002 | Moore ............ A61K 33/22 510/116 |
| 6,830,603 B2 | 12/2004 | Whitehurst et al. |
| 8,048,189 B2 | 11/2011 | Whitehurst et al. |
| 8,133,294 B2 | 3/2012 | Whitehurst et al. |
| 8,163,058 B2 | 4/2012 | Whitehurst et al. |
| 8,603,211 B2 | 12/2013 | Rahn et al. |
| 8,617,425 B2 | 12/2013 | Cigler |
| 9,096,476 B2 | 8/2015 | Roberts |
| 9,266,789 B2 | 2/2016 | Ortiz-Suarez et al. |
| 2003/0152649 A1 * | 8/2003 | Frame ............ A61K 31/015 424/725 |
| 2003/0211943 A1 | 11/2003 | Harwell |
| 2004/0163434 A1 | 8/2004 | Quin |
| 2006/0185411 A1 | 8/2006 | Hojjatie |
| 2007/0077428 A1 | 4/2007 | Hamed et al. |
| 2007/0157689 A1 | 7/2007 | Sutton et al. |
| 2007/0295047 A1 | 12/2007 | Sutton |
| 2008/0039321 A1 * | 2/2008 | Bastiaans ........ A01N 43/90 504/136 |

(Continued)

FOREIGN PATENT DOCUMENTS

| CN | 1417172 A | 5/2003 |
| CN | 101108781 A | 1/2008 |

(Continued)

OTHER PUBLICATIONS

Rhodia, (A Product Data, Jun. 2012).

(Continued)

*Primary Examiner* — Mark Eashoo
*Assistant Examiner* — Mohammad Reza Asdjodi
(74) *Attorney, Agent, or Firm* — Vorys, Sater, Seymour and Pease LLP

(57) ABSTRACT

Solvent systems for the formulation of alkyl thiophosphoric triamide urease inhibitors, that provide stable dispersion of alkyl thiophosphoric triamides for even distribution (in low or high concentrations) onto fertilizers containing urea in liquid or solid form.

23 Claims, No Drawings

(56) References Cited

U.S. PATENT DOCUMENTS

| | | |
|---|---|---|
| 2009/0035384 A1 | 2/2009 | Lambeth et al. |
| 2009/0246287 A1* | 10/2009 | Shoseyov ............ A61K 31/716 424/499 |
| 2009/0281012 A1* | 11/2009 | Trivedi .............. C08G 65/3314 510/138 |
| 2009/0283713 A1* | 11/2009 | Sapienza ................ C09K 3/18 252/76 |
| 2010/0137480 A1 | 6/2010 | Denilson |
| 2010/0206030 A1 | 8/2010 | Whitehurst et al. |
| 2010/0206031 A1 | 8/2010 | Whitehurst et al. |
| 2010/0218575 A1 | 9/2010 | Wissemeier et al. |
| 2011/0113842 A1 | 5/2011 | Urrutia et al. |
| 2011/0154874 A1 | 6/2011 | Rahn et al. |
| 2011/0196172 A1 | 8/2011 | Kysilka et al. |
| 2011/0233474 A1* | 9/2011 | Cigler ..................... C05G 3/08 252/400.21 |
| 2011/0259068 A1 | 10/2011 | Whitehurst et al. |
| 2011/0314883 A1 | 12/2011 | Whitehurst et al. |
| 2012/0096912 A1* | 4/2012 | Rizzo ..................... C05C 3/005 71/29 |
| 2012/0148752 A1 | 6/2012 | Lambeth et al. |
| 2013/0145806 A1* | 6/2013 | Iannotta .................. C05G 3/08 71/27 |
| 2013/0276495 A1 | 10/2013 | Sutton et al. |
| 2014/0037570 A1 | 2/2014 | Whitehurst et al. |
| 2014/0047881 A1 | 2/2014 | Roberts |
| 2014/0047884 A1 | 2/2014 | Gabrielson et al. |
| 2014/0060132 A1 | 3/2014 | Roberts |
| 2014/0090432 A1 | 4/2014 | Mcknight et al. |
| 2014/0174140 A1 | 6/2014 | Ortiz-Suarez et al. |
| 2014/0326030 A1 | 11/2014 | Phillip et al. |
| 2015/0031786 A1 | 1/2015 | Lambeth |
| 2015/0101379 A1 | 4/2015 | Gabrielson et al. |
| 2015/0143860 A1 | 5/2015 | Mcknight et al. |
| 2015/0191501 A1* | 7/2015 | Nash ..................... A61K 36/81 514/23 |
| 2015/0299062 A1 | 10/2015 | Mcknight et al. |
| 2016/0107947 A1 | 4/2016 | Mcknight et al. |
| 2017/0305807 A1 | 10/2017 | Iannotta et al. |

FOREIGN PATENT DOCUMENTS

| | | | |
|---|---|---|---|
| CN | 101200400 B | 6/2008 | |
| CN | 101328097 A | 12/2008 | |
| CN | 101723752 A | 6/2010 | |
| CN | 102746073 A | 10/2012 | |
| CN | 104671999 A | 6/2015 | |
| EP | 0869933 B1 | 6/2009 | |
| EP | 2266400 A1 | 12/2010 | |
| EP | 2032589 B1 | 9/2011 | |
| GB | 932741 | * 7/1963 | |
| GB | 932741 A | 7/1963 | |
| GB | 960109 | 6/1964 | |
| WO | 97722568 | 6/1997 | |
| WO | 2008000196 A1 | 1/2008 | |
| WO | 2009021986 A1 | 2/2009 | |
| WO | 2009021986 A8 | 2/2009 | |
| WO | 2010072184 A2 | 7/2010 | |
| WO | 2010096266 A1 | 8/2010 | |
| WO | 2010145994 A1 | 12/2010 | |
| WO | WO-2010145994 A1 * | 12/2010 | ............ A01N 43/40 |
| WO | 2014036278 A1 | 3/2014 | |
| WO | 2015001457 A3 | 1/2015 | |
| WO | 2016054012 A1 | 4/2016 | |
| WO | 2016064973 A1 | 4/2016 | |

OTHER PUBLICATIONS

Santa Cruz Biotechnology, Product Page For NBPT; CAS #94317-64-3 Data Sheet.

Rick Engel, Volatilization Losses From Surface-Applied Urea During Cold Weather Months', Dec. 13-14, 2011 Manitoba Agronomist Conference, Winnipeg, Manitoba.

Arkema Announces Its New Dmso Website At www.arkema.com/dmso, 1 Page, Nov. 24, 2008, http://www.arkema.com/en/media/news-details/arkema-announces-its-new-dmso-website-at-www.arkema.com-dmso/.

* cited by examiner

SOLVENT SYSTEMS OF N-ALKYL THIOPHOSPHORIC TRIAMIDES AND METHODS OF USE IN AGRICULTURAL APPLICATIONS

CROSS-REFERENCE TO RELATED APPLICATIONS

This application claims the benefit of U.S. Provisional Application Ser. No. 61/630,456, filed on Dec. 12, 2011, herein incorporated by reference.

FIELD OF THE INVENTION

This invention relates to compositions and methods for use of solvent systems containing alkyl thiophosphoric triamides, used to facilitate incorporation of the alkyl thiophosphoric triamides into solid state or liquid state fertilizer formulations.

BACKGROUND OF THE INVENTION

In the current agrochemical market, farmers use various fertilizers to impart macronutrients to plants either by application to the soil or application to plant leaves. Nitrogen, phosphorus, potassium, calcium, magnesium, and sulfur are the six macronutrients that must be supplied to the plants and soil manually by farmers. In many crops, the amount of nitrogen supplied is critical to the overall quality and growth of the crop. Nitrogen is supplied in either urea or ammonium phosphate forms. Due to the high water solubility of these salts, however, much of the nitrogen applied is lost to run-off and leaching. In ammonium-based products, if the nitrogen is not lost to leaching or run-off, it is being converted to ammonia gas by an enzyme called urease where the ammonia can bind to soil particles. Conversion occurring near the surface of the soil, however, does not allow for binding and this ammonia is lost to the atmosphere. Urease inhibitors are used to protect a farmer's investment in fertilizers by preventing the breakdown of urea by urease, the soil microbe responsible for converting urea to usable ammonia in the soil. This increases the amount of time the nitrogen remains in the soil and is available to the plant for absorption.

SUMMARY OF THE INVENTION

Urease inhibitors can be used with a fertilizer (i.e., incorporated into a urea-containing fertilizer) to slow the conversion of ammonium ions to ammonia gas and thus slow the lost of ammonia to volatilization, thus making it available to plants in the soil longer. Increasing the amount of time that the nitrogen is available to the plant increases the effectiveness of the fertilizer which positively impacts crop yield and quality. Fertilizers, in one embodiment, are common water soluble inorganic fertilizers that provide nutrients such as phosphorus-based, nitrogen-based, potassium-based or sulphur-based fertilizers. Examples of such fertilizers include: for nitrogen as the nutrient: nitrates and or ammonium salts such as ammonium nitrate, including in combination with urea e.g. as Uram type materials, calcium ammonium nitrate, ammonium suphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride. It is understood that a fertilizer composition can comprise one or a combination of the fertilizers described herein.

A typical urease inhibitor, NBPT (N-(n-butyl)-thiophosphoric triamide), however, faces drawbacks in its use as NBPT is extremely difficult to handle. NBPT is a sticky, waxy, heat and water sensitive material, which cannot be used in its solid form, as it is used at low concentrations making it difficult to evenly distribute on urea prills (i.e., large granules) and in soil. In order to evenly distribute the NBPT onto the urea, the NBPT should be dispersed into a carrier prior to being sprayed onto the urea. Thus, the use of a solvent system containing the NBPT is desirable as, in its liquid form, the solvent system is capable of distributing the NBPT into granular urea (e.g., urea prills) and into liquid fertilizers containing urea. By introducing the NBPT to liquid fertilizers containing urea (for example, urea-ammonium nitrate solutions or UAN) in a solvent system, the NBPT is capable of being better dispersed in the liquid fertilizer.

Thus, it is desirable to have a low cost solvent system containing alkyl thiophosphoric triamide, and in particular, (N-(n-butyl)-thiophosphoric triamide), that has a favorable toxicological and/or ecological profile and desirable characteristics in terms of low volatility, biodegradability or ready biodegradability (i.e., readily biodegradable), low toxicity or low hazard level.

The present invention described herein will become apparent from the following detailed description and examples, which comprises in one aspect, are formulations comprising a mixture or solution of at least one alkyl thiophosphoric triamide (from about 15% to 35% by weight of formulation) in at least one solvent selected from: at least one dibasic ester (from about 5% to 35% by weight of formulation), at least one dioxolane (from about 25% to 70% by weight of formulation), at least one ester-amide or diamide (from about 10% to 50% by weight of formulation), at least one alkyldimethylamide (from about 10% to 50% by weight of formulation), at least one alkyl lactate (from about 0% to 60% by weight of formulation), ethyl levulinate (from about 0% to 60% by weight of formulation), at least one glycerine or glycerine derivative (from about 0% to 75% by weight of formulation), at least one alkylene carbonate (from about 0% to 60% by weight of formulation), at least one alkyoxyalcohol, ether alcohol, dialkyl alcoholamine (for example, dimethyl ethanolamine, diethyl ethanolamine), amine alcohol, amino alcohol or alcohol (from about 0% to 75% by weight of formulation), or any combination thereof.

In another aspect, described herein are formulations comprising a mixture or solution of at least one alkyl thiophosphoric triamide in at least one solvent selected from the group consisting of:
a) at least one dibasic ester;
b) at least one dioxolane compound of formula (Ia):

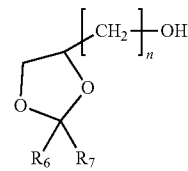

wherein $R_6$ and $R_7$ individually comprises a hydrogen, an alkyl group, an alkenyl group, a phenyl group, wherein n is an integer of from 1 to 10;

c) at least one ester-amide or diamide, which in one embodiment, is at least one compound of formula (IIa):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or branched divalent $C_2$-$C_6$ alkyl group;

d) at least one alkyldimethylamide;
e) at least one alkyl lactate;
f) ethyl levulinate;
g) 2-butoxyethanol;
h) at least one glycerine or glycerine derivative;
l) propylene carbonate; and
j) any combination thereof.

In one embodiment, Regarding the formula II(a), $R_3$ can be group chosen from, among others, saturated or unsaturated, linear or branched, optionally cyclic, optionally aromatic hydrocarbon-based groups comprising an average number of carbon atoms ranging from 1 to 36. In a further embodiment, $R_3$ can is selected from the group consisting of a saturated $C_1$-$C_{36}$ alkyl group, an unsaturated $C_1$-$C_{36}$ alkyl group, a linear $C_1$-$C_{36}$ alkyl group, a branched $C_1$-$C_{36}$ alkyl group, a cyclic $C_1$-$C_{36}$ alkyl group, and an aromatic $C_1$-$C_{36}$ alkyl group.

In another embodiment, $R_4$ and $R_5$, which are identical or different, can be groups chosen from, among others, saturated or unsaturated, linear or branched, optionally cyclic, optionally aromatic, optionally substituted hydrocarbon-based groups comprising an average number of carbon atoms ranging from 1 to 36. A can be a linear or branched divalent alkyl group comprising an average number of carbon atoms ranging from 2 to 12. In a further embodiment, $R_4$ and $R_5$ individually comprise a saturated $C_1$-$C_{36}$ alkyl group, an unsaturated $C_1$-$C_{36}$ alkyl group, a linear $C_1$-$C_{36}$ alkyl group, a branched $C_1$-$C_{36}$ alkyl group, a cyclic $C_1$-$C_{36}$ alkyl group, or an aromatic $C_1$-$C_{36}$ alkyl group.

In one embodiment, alkyl thiophosphoric triamide is N-(n-butyl)-thiophosphoric triamide. The alkyl thiophosphoric triamide can be present in the dispersion in an amount between about 0.5% by weight of the dispersion and about 50% by weight of the dispersion or, in another embodiment, can be present in the dispersion in an amount between about 1% by weight of the dispersion and about 40% by weight of the dispersion, and, in another embodiment, can be present in the dispersion in an amount between about 0.5% by weight of the dispersion and about 20% by weight of the dispersion. In one particular embodiment, the alkyl thiophosphoric triamide is present in the dispersion in an amount between about 1% by weight of the dispersion and about 30% by weight of the dispersion.

The at least one dibasic ester can comprises at least two of: dialkyl methylglutarate, dialkyl ethylsuccinate, dialkyl adipate, dialkyl succinate or dialkyl glutarate. In another embodiment, the at least one dibasic ester comprises a blend of dialkyl methylglutarate, dialkyl ethylsuccinate and, optionally, dialkyl adipate. In a further embodiment, the at least one dibasic ester comprises a blend of dialkyl adipate, dialkyl succinate and dialkyl glutarate.

In one embodiment, the alkyl lactate is a straight pr branched alkyl lactate. In one embodiment, the alkyl lactate is a $C_1$-$C_8$ alkyl lactate. In another embodiment, the alkyl lactate is a $C_1$-$C_5$ alkyl lactate.

In another aspect, described herein are formulations comprising a mixture or solution of at least one alkyl thiophosphoric triamide in at least one solvent selected from the group consisting of:

a) at least one dibasic ester selected from dialkyl methylglutarate, dialkyl ethylsuccinate, dialkyl adipate, dialkyl succinate or dialkyl glutarate;

b) at least one dioxolane compound of formula (Ia):

wherein $R_6$ and $R_7$ individually comprises a hydrogen, an alkyl group, an alkenyl group, a phenyl group, wherein n is an integer of from 1 to 10;

c) at least one compound of formula (IIa):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or branched divalent $C_2$-$C_6$ alkyl group;

d) at least one alkyldimethylamide;
e) at least one alkyl lactate;
l) propylene carbonate; and
j) any combination thereof.

In one embodiment, the alkyldimethylamide is N,N-Dimethyldodecylamide

In one particular embodiment, the dibasic ester is a blend comprising:

(i) a first dibasic ester of formula:

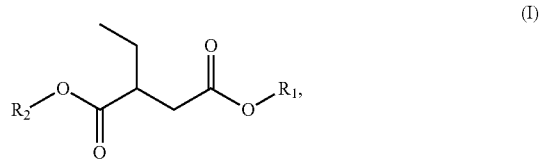

(ii) a second dibasic ester of formula:

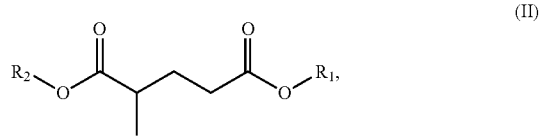

and
(iii) optionally, a third dibasic ester of formula:

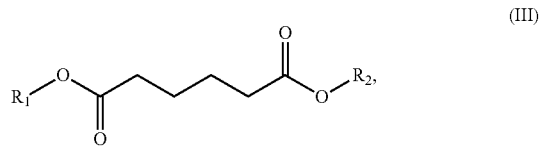

wherein $R_1$ and $R_2$ individually comprise a $C_1$-$C_8$ alkyl group.

In another aspect, described herein are methods for preparing an agricultural composition comprising contacting the formulation of claim 1 with a urea-based fertilizer composition. In one embodiment, urea-based fertilizer composition is in granular or prill form. In another embodiment, the urea-based fertilizer composition is in substantially liquid form.

DETAILED DESCRIPTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "($C_r$-$C_s$)" in reference to an organic group, wherein r and s are each integers, indicates that the group may contain from r carbon atoms to s carbon atoms per group.

As used herein, the terminology "surfactant" means a compound that when dissolved in an aqueous medium lowers the surface tension of the aqueous medium.

In one embodiment, the solvent system is chosen from one or more of the following components (a through j), below. In another embodiment, the solvent is chosen from at least one components, typically, two or more components.
  a) at least one dibasic ester;
  b) at least one dioxolane compound of formula (Ia):

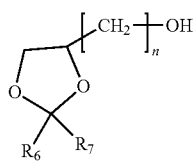
(Ia)

wherein $R_6$ and $R_7$ individually comprises a hydrogen, an alkyl group, an alkenyl group, a phenyl group, wherein n is an integer of from 1 to 10;
  c) at least one compound of formula (IIa):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or branched divalent $C_2$-$C_6$ alkyl group;
  d) at least one alkyldimethylamide;
  e) at least one alkyl lactate;
  f) ethyl levulinate;
  g) 2-butoxyethanol;
  h) at least one glycerine or glycerine derivative;
  i) propylene carbonate; and
  j) any combination thereof.

In one embodiment, a $C_1$-$C_4$ alcohol chosen from t-butyl alcohol, butyl alcohol, iso-propyl alcohol, or propyl alcohol can be added to the solvent. In one typical embodiment, the $C_1$-$C_4$ alcohol is iso-propyl alcohol.

In one embodiment, the solvent comprises (i) one or a (ii) blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_6$ alkyl, and A comprises a mixture of —$(CH_2)_4$—, —$(CH_2)_3$—, and —$(CH_2)_2$—. In another embodiment, $R_1$ and/or $R_2$ comprise, individually, a $C_4$-$C_{12}$ alkyl, more typically a $C_4$-$C_8$ alkyl. In one embodiment, $R_1$ and $R_2$ can individually comprise a hydrocarbon group originating from fusel oil. In one embodiment, $R_1$ and $R_2$ individually can comprise a hydrocarbon group having 1 to 8 carbon atoms. In one embodiment, $R_1$ and $R_2$ individually can comprise a hydrocarbon group having 5 to 8 carbon atoms. In another embodiment, A comprises a least one, typically at least two, of: —$(CH_2)_4$—, —$CH_2CH_2CH(CH_3)$—, —$CH_2CH(C_2H_5)$—, —$(CH_2)_4$—, —$CH_2CH_2CH(CH_3)$—, or —$CH_2CH(C_2H_5)$—.

In one embodiment, the blend comprises adducts of alcohol and branched or linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_8$ alkyl, and A comprises a mixture of —$(CH_2)_4$—, —$CH_2CH_2CH(CH_3)$—, and —$CH_2CH(C_2H_5)$—. In another embodiment, $R_1$ and/or $R_2$ comprise, individually, a $C_4$-$C_{12}$ alkyl, more typically a $C_4$-$C_8$ alkyl. It is understood that the acid portion may be derived from such dibasic acids such as adipic, succinic, glutaric, oxalic, malonic, pimelic, suberic and azelaic acids, as well as mixtures thereof.

The dibasic esters can be obtained by a process comprising an "esterification" stage by reaction of a diacid of formula HOOC-A-COON or of a diester of formula MeOOC-A-COOMe with a branched alcohol or a mixture of alcohols. The reactions can be appropriately catalyzed. Use is preferably made of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters of the present invention may be derived from one or more by-products in the production of polyamide, for example, polyamide 6,6. In one embodiment, the at least one dibasic ester comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the composition comprises a blend of linear or branched, cyclic or noncyclic, $C_1$-$C_{20}$ alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The composition comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:

a diester of formula I:

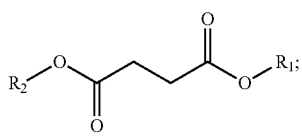

(I)

a diester of formula II:

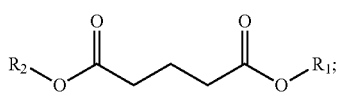

(II)

and
a diester of formula III:

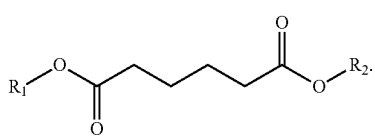

(III)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C.

In certain other embodiments, the dibasic ester blend comprises:
a diester of the formula IV:

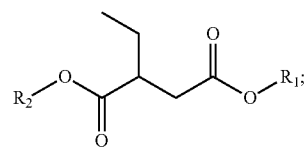

(IV)

a diester of the formula V:

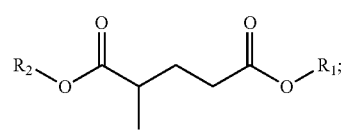

(V)

and, optionally,
a diester of the formula VI:

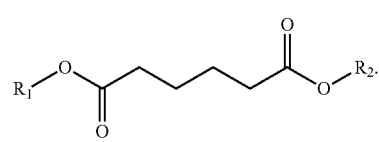

(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of of 98° C., a vapor pressure at 20° C. of less than about 10 Pa, and a distillation temperature range of about 200-275° C.

In another embodiment, the solvent can include other solvents, including but not limited to aliphatic or acyclic hydrocarbons solvents, halogenated solvents, aromatic hydrocarbons solvents, cyclic terpenes, unsaturated hydrocarbon solvents, halocarbon solvents, polyols, alcohols including short chain alcohols, ketones or mixtures thereof.

The dioxane compound utilized as the solvent or in the solvent blend as described herein includes those of formula (I), below:

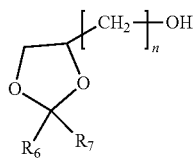

in which: $R_6$ and $R_7$, which are identical or different, represent hydrogen or a $C_1$-$C_{14}$ group or radical. In one embodiment, $R_6$ and $R_7$ are individually selected from an alkyl group, alkenyl group or phenyl radical. In some embodiments, "n" is an integer of 1, 2, 3, 4, 5, 6, 7, 8, 9, 10, 11 or 12. Typically, "n" is an integer ranging from 1 to 4 or "n" is an integer ranging from 1 to 2.

In one particular embodiment, $R_6$ and $R_7$ are radicals individually selected from methyl, ethyl, n-propyl, isopropyl or isobutyl radical.

In one embodiment the dioxolane compound is of formula (I) is 2,2-dimethyl-1,3-dioxolane-4-methanol. In another embodiment, the dioxolane compound of formula (I) is 2,2-diisobutyl-1,3-dioxolane-4-methanol (also known by the acronym IIPG, for the synonym 1-isobutyl-isopropylidene glycerol).

In one embodiment, a compound utilized as the solvent or as a component in the solvent blend is a compound of general formula (II):

$R_3OOC\text{-}A\text{-}CONR_4R_5$ (II),

According to one embodiment, the expression "compound" denotes any compound corresponding to the general formula (II). In other embodiments, the term "compound" also refers to mixtures of several molecules corresponding to general formula (II). It may therefore be a molecule of formula (II) or a mixture of several molecules of formula (II), wherein both fall under the definition of the term "compound" when referring to formula (II).

The $R_3$, $R_4$ and $R_5$ groups can be, in some embodiments, identical or, in other embodiment, different. In one embodiment, may be groups chosen from $C_1$-$C_{20}$ alkyl, aryl, alkaryl or arylalkyl groups or the phenyl group. In another embodiment, may be groups chosen from $C_1$-$C_{12}$ alkyl, aryl, alkaryl or arylalkyl groups or the phenyl group. Mention is made especially of Rhodiasolv® PolarClean (Manufactured by Rhodia Inc. of Cranbury, N.J.). The $R_4$ and $R_5$ groups may optionally be substituted. In one particular embodiment, the groups are substituted with hydroxyl groups.

In one embodiment, $R_3$ group is chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

$R_4$ and $R_5$ groups, which are identical or different, in one embodiment, may especially be chosen from methyl, ethyl, propyl (n-propyl), isopropyl, n-butyl, isobutyl, n-pentyl, amyl, isoamyl, hexyl, cyclohexyl or hydroxyethyl groups. The $R_4$ and $R_5$ groups may also be such that they form, together with the nitrogen atom, a morpholine, piperazine or piperidine group. According to some embodiments, $R_4$ and $R_5$ are each methyl, or $R_4$ and $R_5$ are each ethyl, or $R_4$ and $R_5$ are each hydroxyethyl.

According to one embodiment, if A comprises a linear group of formula —$CH_2CH_2$— and/or of formula —$CH_2$—$CH_2$—$CH_2$—$CH_2$— and/or of formula —$(CH_2)_8$— then it is a mixture of A groups. According to one particular embodiment, if A is linear, then it is a mixture of A groups, for example a mixture of two or three —$CH_2$—$CH_2$— (ethylene); $CH_2$—$CH_2$—$CH_2$— (n-propylene); and —$CH_2$—$CH_2$—$CH_2$—$CH_2$— (n-butylene) groups (or isomers thereof).

According to a first particular embodiment of the invention, the A group is a divalent linear alkyl group chosen from the groups of the following formulae: —$CH_2$—$CH_2$— (ethylene); —$CH_2$—$CH_2$—$CH_2$— (n-propylene); —$CH_2$—$CH_2$—$CH_2$—$CH_2$— (n-butylene), and mixtures thereof.

According to such embodiment, the compound is a mixture according to the following mixture of molecules:

$R_3OOC$—$(CH_2)_2$—$CONR_4R_5$;

$R_3OOC$—$(CH_2)_3$—$CONR_4R_5$; and $R_3OOC$—$(CH_2)_4$—$CONR_4R_5$

According to another particular embodiment of the invention, the A group is a divalent branched alkyl group chosen from the groups of the following formulae: —$CH(CH_3)$—$CH_2$—$CH_2$—; —$CH(C_2H_5)$—$CH_2$—; and, optionally, —$CH_2$—$CH_2$—$CH_2$—$CH_2$—; as well as mixtures thereof.

According to such embodiment, the compound is a mixture according to the following mixture of molecules:

$R_3OOC$—$CH(CH_3)(CH_2)_2$—$CONR_4R_5$;

$R_3OOC$—$CH(C_2H_5)CH_2$—$CONR_4R_5$; and, optionally, $R_3OOC$—$(CH_2)_4$—$CONR_4R_5$ According to one particular variant in this first embodiment, the compound of the invention is chosen from the following compounds:

MeOOC—$CH_2$—$CH_2$—$CONMe_2$;

MeOOC—$CH_2$—$CH_2$—$CH_2$—CON $Me_2$;

MeOOC—$CH_2$—$CH_2CH_2$—CON $Me_2$, as a mixture with MeOOCC—$CH_2$—$CH_2$—$CH_2$—$CH_2$—CON $Me_2$ and/or with MeOOC—$CH_2$—$CH_2$—CON $Me_2$.

According to another embodiment of the invention, the A group is a divalent branched alkylene group having one of the following formulae (IIa), (IIb), (IIc), (IIIa) and (IIIb), or a mixture of at least two groups chosen from the groups of formulae (IIa), (IIb) and (IIc) or from the groups of formulae (IIIa) and (IIIb), or a mixture of at least two groups, one chosen from the groups of formulae (IIa), (IIb) and (IIc) and the others chosen from the groups of formulae (IIIa) and (IIIb):

—$(CHR_9)_y$—$(CHR_8)_x$—$(CHR_9)_z$—$CH_2$—$CH_2$— (IIa)

—$CH_2$—$CH_2$—$(CHR_9)_z$—$(CHR_8)_x$—$(CHR_9)_y$— (IIb)

—$(CHR_9)_z$—$CH_2$—$(CHR_8)_x$—$CH_2$—$(CHR_9)_y$— (IIc)

—$(CHR_9)_y$—$(CHR_8)_x$—$(CHR_9)_z$—$CH_2$— (IIIa)

—$CH_2$—$(CHR_9)z\text{-}(CHR_8)_x$—$(CHR_9)_y$— (IIIb)

where:
x is an integer greater than 0;
y is an average integer greater than or equal to 0;
z is an average integer greater than or equal to 0; $R_8$, which is identical or different, is a $C_1$-$C_6$, preferably $C_1$-$C_4$, alkyl group; and $R_9$, which is identical or different, is a hydrogen atom or a $C_1$-$C_6$, preferably $C_1$-$C_4$, alkyl group. In this particular embodiment, the A group is preferably a group such that y and z are 0.

In one embodiment, in formula (IIa) and/or in the formula (IIb): x is 1; y and z are 0; $R_8$ is methyl.

In another embodiment, in the formula (IIIa) and/or in the formula (IIIb): x is 1; y and z are 0; $R_8$ is ethyl.

According to another embodiment, the compound of the invention is chosen from the following compounds, and mixtures thereof:

MeOOC-$A_{MG}$-CONMe$_2$;

MeOOC-$A_{ES}$-CONMe$_2$;

PeOOC-$A_{MG}$-CONMe$_2$;

PeOOC-$A_{ES}$-CONMe$_2$;

CycloOOC-$A_{MG}$-CONMe$_2$;

CycloOOC-$A_{ES}$-CONMe$_2$;

EhOOC-$A_{MG}$-CONMe$_2$;

EhOOC-$A_{ES}$-CONMe$_2$;

PeOOC-$A_{MG}$-CONEt$_2$;

PeOOC-$A_{ES}$-CONEt$_2$;

CycloOOC-$A_{MG}$-CONE$_2$;

CycloOOC-$A_{ES}$-CONEt$_2$;

BuOOC-$A_{MG}$-CONEt$_2$;

BuOOC-$A_{ES}$-CONEt$_2$;

BuOOC-$A_{MG}$-CONMe$_2$;

BuOOC-$A_{ES}$-CONMe$_2$;

EtBuOOC-$A_{MG}$-CONMe$_2$;

EtBuOOC-$A_{ES}$-CONMe$_2$;

n-HeOOC-$A_{MG}$-CONMe$_2$;

n-HeOOC-$A_{ES}$-CONMe$_2$;

where $A_{MG}$ represents an $MG_a$ group of formula —CH(CH$_3$)—CH$_2$—CH$_2$—, or $MG_b$ group of formula —CH$_2$—CH$_2$—CH(CH$_3$)— or a mixture of $MG_a$ and $MG_b$ groups;

$A_{ES}$ represents an $ES_a$ group of formula —CH(C$_2$H$_5$)—CH$_2$—, or $ES_b$ group of formula —CH$_2$—CH(C$_2$H$_5$)— or a mixture of $ES_a$ and $ES_b$ groups;

Pe represents a pentyl group, preferably an isopentyl or isoamyl group;

Cyclo represents a cyclohexyl group;

Eh represents a 2-ethylhexyl group;

Bu represents a butyl group, preferably an n-butyl or tert-butyl group;

EtBu represents an ethylbutyl group; and n-He represents an n-hexyl group.

It is mentioned that according to one particular embodiment, the compound of the invention is a compound different from the following compounds:

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$; and

MeOOC—CH$_2$—CH$_2$—CONMe$_2$;

if the latter are not used as a mixture with other compounds corresponding to formula (II).

It is mentioned that according to one even more particular variant of one or the other of the particular embodiments of the invention, the compound of the invention is a novel compound of the invention, different from the following compounds or mixtures, if the latter, individually, are not used as a mixture with other compounds corresponding to formula (II):

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$; and MeOOC—CH$_2$—CH(CH$_3$)—CH$_2$—CONH(n-butyl).

It is mentioned that according to one even more particular variant of one or the other of the particular embodiments of the invention, the compound of the invention is a novel compound of the invention, different from the following compounds or mixtures, if the latter, individually, are not used as a mixture with other compounds corresponding to formula (II):

C$_4$H$_9$—OOC—CH$_2$—CH$_2$—CONEt$_2$

C$_6$H$_{13}$—OOC—(CH$_2$)$_8$—CON(C$_3$H$_7$)$_2$

C$_8$H$_{17}$—OOC—(CH$_2$)$_8$—CON(C$_4$H$_9$)$_2$

C$_8$H$_{17}$—OOC—(CH$_2$)$_8$—CON(C$_8$H$_{17}$)$_2$.

In one embodiment, it is possible to use the following compounds as a mixture with other compounds corresponding to formula (II):

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$;

MeOOC—CH$_2$—CH(CH$_3$)—CH$_2$—CONH(n-butyl);

C$_4$H$_9$—OOC—CH$_2$CH$_2$—CONEt$_2$;

C$_6$H$_{13}$—OOC—(CH$_2$)$_8$—CON(C$_3$H$_7$)$_2$;

C$_8$H$_{17}$OOC—(CH$_2$)$_8$—CON(C$_4$H$_9$)$_2$; and

C$_8$H$_{17}$—OCC—(CH$_2$)$_8$—CON(C$_8$H$_{17}$)$_2$.

It is mentioned that according to one still more particular variant of one or the other of the particular embodiments of the invention, the following compounds or mixtures are not used:

MeOOC—CHEt-CH$_2$—CONMe$_2$;

MeOOC—CH$_2$—CH(CH$_3$)—CH$_2$—CONMe$_2$;

MeOOC—CH$_2$—CH$_2$—CH$_2$—CONMe$_2$;

MeOOC—CH$_2$—CH$_2$—CONMe$_2$;

mixture of PhOOC—CH(CH$_3$)—CH$_2$—CONEt$_2$ and PhOOC—CH$_2$—CH$_2$—CH$_2$—CONEt$_2$;

EtOOC—CH(CH$_3$)—CH$_2$—CONEt$_2$;

MeOOC—CH(CH$_3$)—CH$_2$—CONEt$_2$;

Me-CH(OMe)-OOC—CH(CH$_3$)—CH$_2$—CONEt$_2$;

Cyclohexyl-OOC—CH(CH$_3$)—CH$_2$—CONEt$_2$;

Ph-CH$_2$OOC—CH(CH$_3$)—CH$_2$—CONEt$_2$;

p-cresyl-OOC—CH(CH$_3$)—CH$_2$—CONEt$_2$;

mixture of EtOOC—CHEt-CH$_2$—CONEt$_2$, EtOOC—CH(CH$_3$)—CH$_2$—CH$_2$—CONEt$_2$ and EtOOC—CH$_2$—CH$_2$—CH$_2$—CH$_2$—CONEt$_2$; and MeOOC—CH$_2$—CH(CH$_3$)—CH$_2$—CONH(n-butyl).

It is mentioned that according to one still more particular variant of one or the other of the particular embodiments of the invention, the following compounds or mixtures are not used:

C$_4$H$_9$—OOC—CH$_2$—CH$_2$—CONEt$_2$;

C$_6$H$_{13}$—OOC—(CH$_2$)$_8$—CON(C$_3$H$_7$)$_2$;

C$_3$H$_{17}$—OOC—(CH$_2$)$_8$—CON(C$_4$H$_9$)$_2$;

C$_8$H$_{17}$—OOC—(CH$_2$)$_8$—CON(C$_8$H$_{17}$)$_2$.

According to one embodiment, the esteramide has a melting point that is less than or equal to 20° C., preferably 5° C., preferably 0° C.

In one particular embodiment, R$_3$ is a group chosen from saturated or unsaturated, linear or branched, optionally cyclic, optionally aromatic hydrocarbon-based groups comprising an average number of carbon atoms ranging from 1 to 36. R$_4$ and R$_5$, which are identical or different, are groups chosen from saturated or unsaturated, linear or branched, optionally cyclic, optionally aromatic, optionally substituted hydrocarbon-based groups comprising an average number of carbon atoms ranging from 1 to 36. It is possible for R$_4$ and R$_5$ to form a ring together, and in some embodiment, the ring is optionally substituted and/or optionally comprises a heteroatom. In some embodiments, A is a linear or branched divalent alkyl group comprising an average number of carbon atoms ranging from 1 to 20, in some embodiments, from 2 to 12, in other embodiments, from 2 to 8, in yet other embodiments, from 2 to 4.

In one embodiment, the solvent comprises amides, alkyl amides, or dialkyl amides. In an alternative embodiment, one component in the solvent blend comprises an amide, alkyl amide, and/or dialkyl amide. In one particular embodiment, the solvent or solvent blend is alkyldimethylamide (ADMA). The alkyl group is a C$_1$-C$_{50}$ alkyl group, more typically a C$_2$-C$_{30}$ alkyl group, even more typically, a C$_2$-C$_{20}$ alkyl group. In one particular embodiment, the alkyldimethylamide is N,N-dimethyldecanamide (miscibility 0.034%) or N,N-dinnethyloctanamide (miscibility 0.43%), or mixtures thereof. Mention is made especially of the compounds sold by Rhodia, Rhodiasolv® ADMA810 and Rhodiasolv® ADMA10.

In another embodiment, the solvent system can contain one or more surfactants. The surfactant can be any number of cationic, amphoteric, zwitterionic, anionic or nonionic surfactants, derivatives thereof, as well as blends of such surfactants.

In one embodiment, the nonionic surfactants generally includes one or more of for example amides such as alkanolamides, ethoxylated alkanolamides, ethylene bisamides; esters such as fatty acid esters, glycerol esters, ethoxylated fatty acid esters, sorbitan esters, ethoxylated sorbitan; ethoxylates such as alkylphenol ethoxylates, alcohol ethoxylates, tristyrylphenol ethoxylates, mercaptan ethoxylates; end-capped and EO/PO block copolymers such as ethylene oxide/propylene oxide block copolymers, chlorine capped ethoxylates, tetra-functional block copolymers; amine oxides such lauramine oxide, cocamine oxide, stearamine oxide, stearamidopropylamine oxide, palm itamidopropylamine oxide, decylamine oxide; fatty alcohols such as decyl alcohol, lauryl alcohol, tridecyl alcohol, myristyl alcohol, cetyl alcohol, stearyl alcohol, oleyl alcohol, linoleyl alcohol and linolenyl alcohol; and alkoxylated alcohols such as ethoxylated lauryl alcohol, trideceth alcohols; and fatty acids such as lauric acid, oleic acid, stearic acid, myristic acid, cetearic acid, isostearic acid, linoleic acid, linolenic acid, ricinoleic acid, elaidic acid, arichidonic acid, myristoleic acid and mixtures thereof.

In another embodiment, the non-ionic surfactant is a glycol such as polyethylene glycol (PEG), alkyl PEG esters, polypropylene glycol (PPG) and derivatives thereof. In one embodiment, the surfactant is an alcohol ethoxylate, an alkyl phenol ethoxylate or a terpene alkoxylate. In one exemplary embodiment, the surfactant is a C$_6$-C$_{13}$ alcohol ethoxylate and, more typically, a C$_8$-C$_{12}$ alcohol ethoxylate.

In another embodiment, the surfactant is a cationic surfactant. The cationic surfactant includes but is not limited to quaternary ammonium compounds, such as cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or Quaternium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride and distearyldimonium chloride; isostearylaminopropalkonium chloride or olealkonium chloride; behentrimonium chloride; as well as mixtures thereof.

In another embodiment, the surfactant is an anionic surfactant. The anionic surfactant includes but is not limited to linear alkylbenzene sulfonates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, monoalkyl phosphates, dialkyl phosphates, sarcosinates, sulfosuccinates, isethionates, and taurates, as well as mixtures thereof. Commonly used anionic surfactants that are suitable as the anionic surfactant component of the composition of the present invention include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, ammonium lauryl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocyl sulfate, potassium lauryl sulfate, monoethanolamine cocyl sulfate, sodium tridecyl benzene sulfonate, and sodium dodecyl benzene sulfonate. Branched anionic surfactants are particularly preferred, such as sodium trideceth sulfate, sodium tridecyl sulfate, ammonium trideceth sulfate, ammonium tridecyl sulfate, and sodium trideceth carboxylate.

Any amphoteric surfactant that is acceptable for use includes but is not limited to derivatives of aliphatic secondary and tertiary amines in which the aliphatic radical can be straight chain or branched and wherein one of the aliphatic substituents contains from about 8 to about 18 carbon atoms and one contains an anionic water solubilizing group. Specific examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates, such as for example, cocoamphoacetate cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Suitable zwitterionic surfactants include alkyl betaines, such as cocodimethyl carboxymethyl betaine, lauryl dimethyl carboxymethyl betaine, lauryl dimethyl alpha-carboxy-ethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl) sulfopropyl betaine, and alkylamidopropylhydroxy sultaines.

The solvent system described herein are characterized by having improved stability of NBPT; improved solubility characteristics; low toxicity of the solvents; good storage characteristics; and good adsorption characteristics onto the urea-containing fertilizers and excellent miscibility with liquid urea containing fertilizer formulations.

EXPERIMENTS

The solvent systems embodied herein were screened to assess compatibility with NBPT. To prepare each sample, the components (NBPT, solvents, and dye) were combined and stirred at room temperature until uniform. The samples were then vacuum-filtered through Whatman 1 filtration paper to remove any undissolved pigment. A combination of solvents was used to meet the concentration requirements and stability characteristics. The solvents tested that resulted in some degree of success with select molecular structures are as follows:

TABLE 1

| R0985-165-01 | | |
|---|---|---|
| NBPT | 21.0% | 26.25 |
| Rhodiasolv Polarclean | 30.5% | 38.11 |
| Purasolv EL | 48.2% | 60.26 |
| Dye | 0.3% | 0.38 |
| | 100.0% | 125.0 |

From Table 1, Polarclean is Methyl-5-(dimethylamino)-2-methyl-5-oxopentanoate and Purasolv EL is an Ethyl-(S)-lactate.

TABLE 2

| R0985-165-02 | | |
|---|---|---|
| NBPT | 21.0% | 26.25 |
| Rhodiasolv ADMA | 30.9% | 38.66 |
| Purasolv EL | 43.5% | 54.38 |
| Water | 3.2% | 4.00 |
| Urea | 1.1% | 1.34 |
| Dye | 0.3% | 0.38 |
| | 100.00% | 125.0 |

TABLE 3

| R0985-165-03 | | |
|---|---|---|
| NBPT | 21.00% | 26.25 |
| Rhodiasolv ADMA | 27.50% | 34.38 |
| Purasolv EL | 51.20% | 64.00 |
| Dye | 0.3% | 0.38 |
| | 100.00% | 125.00 |

TABLE 4

| R0985-167-01 | | |
|---|---|---|
| NBPT | 21.00% | 26.25 |
| Augeo SL-191 | 59.16% | 73.95 |
| Rhodiasolv LI-TEC | 19.54% | 24.43 |
| Dye | 0.3% | 0.38 |
| | 100.00% | 125.00 |

From Table 4, Rhodiasolv LI-TEC is a proprietary blend of dibasic esters comprising a dialkyl methylglutarate as the primary dibasic ester, along with one or more additional dibasic esters.

TABLE 5

| R0985-167-02 | | |
|---|---|---|
| NBPT | 26.65% | 32.50 |
| Augeo SL-191 | 54.65% | 69.15 |
| Rhodiasolv LI-TEC | 18.4% | 22.98 |
| Dye | 0.3% | 0.38 |
| | 100.00% | 125.00 |

From the Tables above, all blend components are suitable for use in fertilizer applications in the United States. The formulations, and specially Table 5, meets stability and requirements and application requirements, as compatible with urea prills, UAN, and passes the smell test.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation in scope is to be inferred.

What is claimed is:

1. A composition comprising:
   a) at least one alkyl thiophosphoric triamide as a urease inhibitor, wherein the alkyl thiophosphoric triamide is present in an amount between 15% by weight of the composition and 35% by weight of the composition;
   b) a solvent comprising at least one dioxolane compound of formula (Ia):

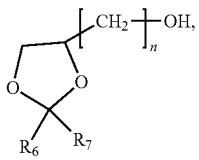

(Ia)

wherein $R_6$ and $R_7$ individually comprises an alkyl group, an alkenyl group, or a phenyl group, wherein n is an integer of from 1 to 10, wherein the dioxolane compound is present in an amount from at least 25% by weight of the composition; wherein the composition is free of amide solvent.

2. The composition of claim 1,
   wherein the dioxolane compound is present in an amount from 25% by weight of the composition to 70% by weight of the composition,
   optionally further comprising a co-solvent selected from the group consisting of:
   at least one dibasic ester;
   at least one alkyl lactate;
   ethyl levulinate;
   at least one alkyoxyalcohol, ether alcohol, amine alcohol, amino alcohol or alcohol;
   at least one glycerine or glycerine derivative;
   at least one alkylene carbonate;
   ketones;
   aliphatic or acyclic hydrocarbon solvents;
   halogenated solvents;
   aromatic hydrocarbon solvents;
   cyclic terpenes;
   unsaturated hydrocarbon solvents;
   halocarbon solvents; and
   any combination thereof.

3. The composition of claim 2, comprising the at least one dibasic ester, wherein the at least one dibasic ester comprises at least two of: dialkyl methylglutarate, dialkyl ethylsuccinate, dialkyl adipate, dialkyl succinate or dialkyl glutarate.

4. The composition of claim 2, comprising the at least one dibasic ester, wherein the at least one dibasic ester comprises a blend of dialkyl methylglutarate, dialkyl ethylsuccinate and, optionally, dialkyl adipate.

5. The composition of claim 2, comprising the at least one dibasic ester, wherein the at least one dibasic ester comprises a blend of dialkyl adipate, dialkyl succinate and dialkyl glutarate.

6. The composition of claim 2, comprising the alkyl lactate, wherein the alkyl lactate is a $C_1$-$C_8$ alkyl lactate.

7. The composition of claim 2, comprising the alkoxyalcohol, wherein the alkoxyalcohol is 2-butoxyethanol.

8. The composition of claim 2, comprising the alkylene carbonate, wherein the at least one alkylene carbonate is propylene carbonate.

9. The composition of claim 2, comprising the amine alcohol, wherein the amine alcohol is selected from the group consisting of ethanolamine, propanolamine, dialkyl alkanolamines, methanolamine, and any combination thereof.

10. The composition of claim 1, wherein n is an integer of from 1 to 4 and $R_6$ and $R_7$ individually comprises an alkyl group, and the alkyl thiophosphoric triamide is N-(n-butyl)-thiophosphoric triamide.

11. The composition of claim 1, wherein n is an integer of from 1 to 2 and $R_6$ and $R_7$ are each selected from the group consisting of methyl, ethyl, n-propyl, isopropyl, n-butyl, sec-butyl, t-butyl, and isobutyl and the alkyl thiophosphoric triamide is N-(n-butyl)-thiophosphoric triamide and present in an amount between 15% by weight of the composition and 26.25% by weight of the composition.

12. The composition of claim 1, wherein n is 1 and $R_6$ and $R_7$ are each methyl, wherein the dioxolane compound is present in an amount from 25% to 70% by weight of the composition, wherein the alkyl thiophosphoric triamide is N-(n-butyl)-thiophosphoric triamide and present in an amount between 20% by weight of the composition and 30% by weight of the composition.

13. The composition of claim 1,
   wherein the dioxolane compound is present in an amount from 54.65% by weight of the composition to 70% by weight of the composition; and
   wherein there is an absence of amide surfactant.

14. The composition of claim 1, wherein the composition is a flowable liquid composition.

15. The composition of claim 14, wherein the flowable liquid composition is a homogenous solution.

16. The composition of claim 14, wherein the flowable liquid composition is a mixture.

17. The composition of claim 1, wherein the alkyl thiophosphoric triamide is present in an amount between 20% and 35% by weight of the composition.

18. The composition of claim 1, wherein the alkyl thiophosphoric triamide is N-(n-butyl)-thiophosphoric triamide and present in an amount between 26.25% and 35% by weight of the composition.

19. The composition of claim 1, wherein the alkyl thiophosphoric triamide is N-(n-butyl)-thiophosphoric triamide and present in the dispersion in an amount between 30% by weight of the dispersion and 35% by weight of the composition.

20. The composition of claim 1, further comprises at least one dibasic ester blend comprising:
(i) a first dibasic ester of formula:

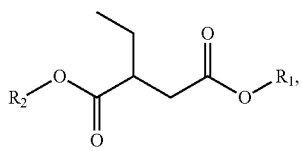

(I)

(ii) a second dibasic ester of formula:

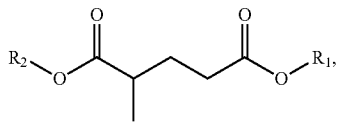

(II)

and (iii) optionally, a third dibasic ester of formula:

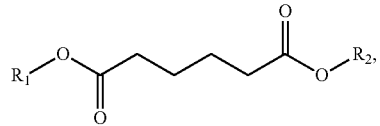

(III)

wherein $R_1$ and $R_2$ individually comprise a $C_1$-$C_8$ alkyl group.

21. A method for preparing an agricultural composition comprising contacting the composition of claim 1 with a nitrogen-based fertilizer composition.

22. The method of claim 21, wherein the nitrogen-based fertilizer composition is in granular form.

23. The method of claim 21, wherein the nitrogen-based fertilizer composition is in substantially liquid form.

* * * * *